Jan. 18, 1927.
L. J. LEON
1,614,927
BASE FOR BIRDCAGES
Filed Oct. 5, 1925
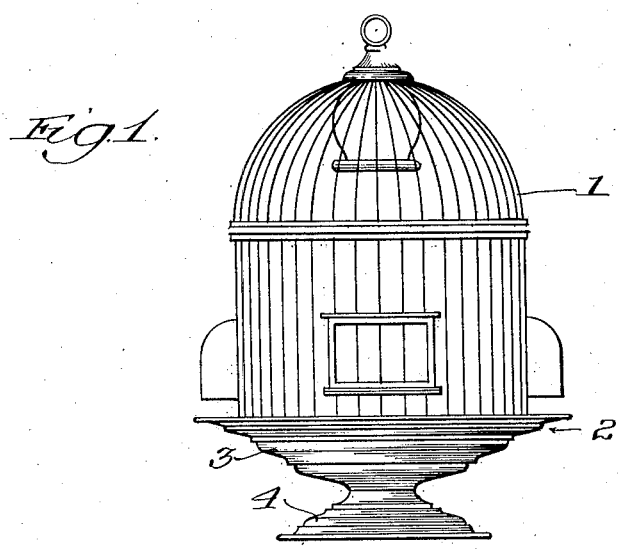
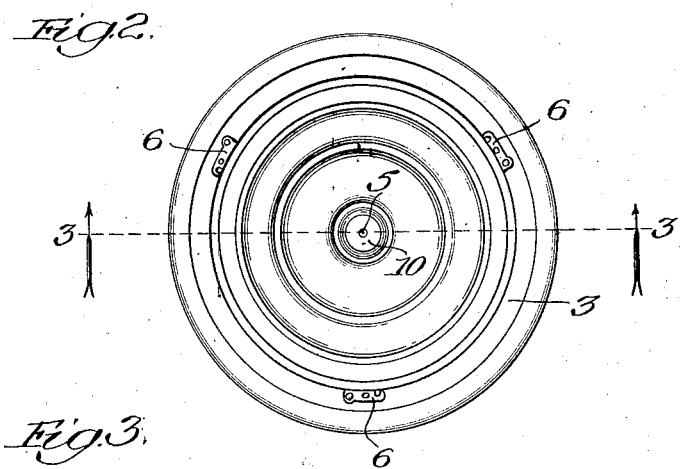
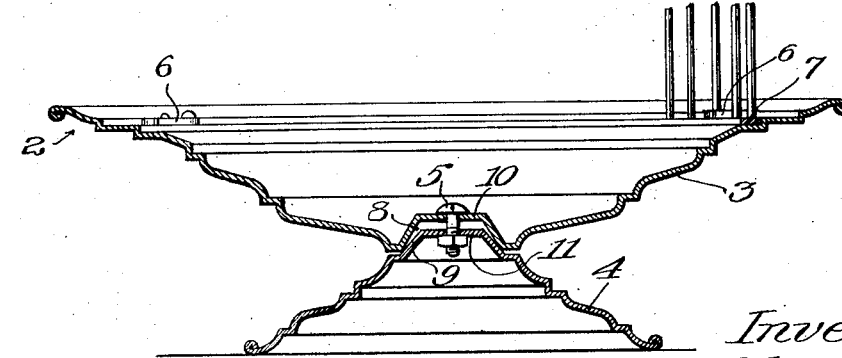
Inventor,
L. J. Leon, Patented Jan. 18, 1927.

1,614,927

UNITED STATES PATENT OFFICE.

LEWICKI J. LEON, OF WEST CHICAGO, ILLINOIS.

BASE FOR BIRDCAGES.

Application filed October 5, 1925. Serial No. 60,464.

The base contemplated by this invention is composed of independently formed upper and lower parts, both generally dish or bowl shape and arranged one on the other with the lower part inverted and bolted or otherwise secured to the upper part.

One object of my invention is to provide a connection between the parts stronger and more rigid than obtainable by any heretofore employed means for the relatively light material of which said parts are made, so that they will not become loose to rattle or to mar the general appearance of the base by having a loose hanging fit.

The invention consists further in the matters hereinafter described and claimed.

In the accompanying drawings—

Fig. 1 is a front view of a bird-cage provided with a two-part base of my invention;

Fig. 2 is a top plan view of the base; and

Fig. 3 is an enlarged vertical sectional view, taken on line 3—3 of Fig. 2, a portion of the base ring of the cage body being shown.

As illustrated in Fig. 1, the cage comprises a body 1 composed of spaced wires, as usual in cage design, and a base 2. The latter is composed of two separably made parts, an upper part 3 and a lower part 4. These parts are secured together by a centrally disposed bolt 5 or other fastening means. The parts 3 and 4 are preferably made from light sheet material, such as brass, copper, aluminum, celluloid, or the like, and are both generally bowl or dish shape and arranged one on the other side with the lower part inverted and secured to the upper part by the member 5, as shown in Fig. 3.

The upper part 3 opens upward to receive the tray or pan (not shown) of the cage and also the lower end of the cage body 1, there being catches 6, 6 on the upper part 3 to engage over and hold the base ring 7 of the cage body against the upper part 3, as shown. The lower part 4 constitutes the foot piece or rest for the cage when set on a table or other underlying support.

Centrally disposed in the bottom wall of the upper part 3 is a downwardly opening socket 8 to receive a suitably shaped projection 9 forming the top of the lower part 4, as shown in Fig. 3. The bolt 5 passes through the opposed walls 10 and 11 of these interfitting portions and, when the nut thereon is turned against the adjacent one of these walls, the projection 9 is drawn tightly into the socket 8 to clamp the upper and lower parts 3 and 4 together.

The inclined side walls of the projection 9 and socket 8 are at different angles, with the socket steeper than the projection, so that the base of the projection 9 is larger than the entrance or outer end of the socket. As shown in the drawings, the projection and socket are frusto-conical in shape, and the projection terminates short of the bottom of the socket, thus permitting the bolt 5 to draw the projection tightly into the socket on tightening the nut on the bolt, the tension on the latter maintained to hold the parts 3 and 4 tightly together.

The inclined side walls of the socket 8 and the projection 9 extending upward, positions these walls to take more or less edgewise the weight of the cage and also the clamping force of the bolt 5, or such other fastening means as may be employed, for drawing the parts tightly together. This makes said walls better resist such strains and allows a strong and rigid connection to be obtained for the light material employed in the parts.

The spacing between the walls 10 and 11 permits the bolt to be tightened to take up any looseness or play that may develop by reason of the lightness or thinness of the material of which the parts 3 and 4 are made. Being able to maintain the parts tightly clamped together, the lower part 4 will not become loose from the upper part to rattle or have a loose hanging fit as with the types of connection heretofore employed.

My invention may be employed for clamping together any two parts made of sheet metal or light material, and I do not wish to be limited to its application to bases for bird cages. When used in other connections, the parts or members will have the socket and projection, respectively, and have the projection held tightly in the socket as shown and described.

I claim as my invention:

1. The combination of two independently formed members made of relatively light material and adapted to be clamped together, said members having a socket and a projection, respectively, with the projection entering the socket, the side walls of the projection and the socket being inclined at different angles so that both take the clamping pressure more or less edgewise, and means for clamping the projection tightly in the socket.

2. A bird-cage base composed of upper and lower parts, both generally bowl shape and arranged with lower part inverted and below the upper part, said parts having a socket and a projection, respectively, with the projection entering the socket, the side walls of the socket and the projection being at different inclinations so that both take the clamping pressure more or less edgewise, and means for clamping the projection tightly in the socket.

3. A bird-cage base composed of upper and lower parts, both generally bowl shape and arranged with the lower part inverted and below the upper part, the upper part having a frusto-conical socket and the lower part having a like shaped projection to enter the socket with the projection terminating short of the bottom of the socket, the side walls of the socket and the projection being inclined at different angles so that both take the clamping pressure more or less edgewise, and a bolt extending into the socket and engaging the projection for drawing the parts tightly together.

In testimony whereof I affix my signature this 1st day of October, 1925.

LEWICKI J. LEON.